Oct. 11, 1966 J. VROMAN 3,278,758

ANTI-COINCIDENCE LOGIC CIRCUITS

Filed Dec. 4, 1963 4 Sheets-Sheet 1

Inventor
JAN VROMAN
By [signature]
Attorney

Inventor
JAN VROMAN
By [signature]
Attorney

Inventor
JAN VROMAN
By [signature]
Attorney

Oct. 11, 1966 J. VROMAN 3,278,758

ANTI-COINCIDENCE LOGIC CIRCUITS

Filed Dec. 4, 1963 4 Sheets-Sheet 4

Inventor
JAN VROMAN
By [signature] Attorney

United States Patent Office 3,278,758
Patented Oct. 11, 1966

3,278,758

ANTI-COINCIDENCE LOGIC CIRCUITS

Jan Vroman, Borgerhout-Antwerp, Belgium, assignor to International Standard Electric Corporation, New York, N.Y., a corporation of Delaware Filed Dec. 4, 1963, Ser. No. 327,988
Claims priority, application Belgium, Dec. 17, 1962, 286,847
3 Claims. (Cl. 307—88.5)

The invention relates to anti-coincidence logic circuits having two or more inputs and designed to produce output signals upon anti-coincidence between input signals.

Anti-coincidence logic circuits of the described type may be used in a variety of ways. For instance, one use is to detect abnormal conditions of circuits which should be in the same electrical condition. Thus, these circuits may be used in parity checking circuits, or in circuits to produce a binary sum or difference as in a half-adder or in a half-subtracter. In its simplest form, this logic circuit may have two inputs and a single output, in which case it may be called an exclusive-OR gate.

In its two-input exclusive-OR gate form, an anti-coincidence circuit usually is arranged in two symmetrical half-circuits. Each half-circuit includes an inverter having an output which constitutes one input of a two-input AND gate. The input of the inverter and the other input of the AND gate constitute two inputs for the first half-circuit. The other half-circuit is the same but its inputs are cross-connected to the two inputs of the first half-circuit in a way so that each of two inputs of the total circuit (i.e., the two half-circuits) is connected to an inverter and to an AND gate input. By mixing the two outputs of the AND gates, an exclusive-OR output is obtained.

If the two outputs are not mixed, but are kept separate, one output delivers an activating signal when the first input is at a high voltage and the second input is at a low voltage. The second output delivers its activating signal when the input conditions are reversed. By way of example, if these separate outputs are connected to the two inputs of a flip-flop, each flip-flop input can receive an activating signal for only one particular combination of two input signals out of four possible combinations afforded by two two-level input signals. These activating signals are the two conditions corresponding to complementary input signals. When both input signals are low or both are high, the state of the flip-flop cannot be changed.

In synchronous logical circuits, clock pulses may be applied to an extra input of the two AND gates. With such a two-input two-output circuit of the exclusive-OR type, either the low or the high voltage level of the input signals may be combined with a clock pulse to trigger the flip-flop. This would not be possible by merely driving the two flip-flops without the described interconnection between the two inputs because once a flip-flop is designed, it is committed to respond to either the high or the low voltage level signal, but not to both.

A general drawback of the logic circuits mentioned above is that they require one or more inverters. Generally, each inverter uses at least one active element, such as a transistor. Also, diodes are required for isolating each of the inputs. In fact, one prior art example of the anti-coincidence circuit requires three diodes per input.

In logic circuits of the synchronous type, it is also desirable to allow simultaneous changes of the signals. This can be achieved by a memory effect usually obtained by using a capacitor which may be charged by a controlling clock pulse. The voltage across the capacitor depends upon the value of the controlling signal. Thus, the two inputs of a flip-flop may be separately driven in a way such that upon the occurrence of a clock pulse, the flip-flop is triggered into one or the other of its two conditions. It is, therefore, immaterial whether the controlling signals appearing at the input are or are not modified.

A general object of the invention is to provide anti-coincidence logic circuits using reactance devices to secure a memory effect, while avoiding active elements. Another object is to reduce the number of diodes required at each input terminal.

In accordance with an aspect of the invention, anti-coincidence logic circuits are provided with a number of inputs. Each of the inputs is connected to a circuit branch including a resistive impedance. The branches are coupled to one another by a network of reactive impedances so that clock pulses are applied to the network through at least one diode. One level of clock pulses enables energy to be stored in the reactive impedances to which said clock pulses are applied upon anti-coincidences in the levels of corresponding inputs. The energy is stored in the reactive impedances as a result of energy dissipated in at least one of the resistive impedances. Another level of the clock pulses enables distinguishable output signals to be delivered by the reactive impedances.

In accordance with another aspect of the invention, anti-coincidence logic circuits have resistive impedances which are interconnected by one or more capacitors. At least one or more sources of clock pulses are then connected to one or more of the capacitors through one or more diodes. Thus, an extremely simple general purpose anti-coincidence logic circuit can be provided when the circuit is operating on a voltage basis and using capacitors as reactive elements. If only a single output is desired, as in an exclusive-OR gate, the ends of the resistive impedances which are away from the inputs can be connected to the single output by means of isolating diodes. Clock pulse control is possible, and the circuit possesses a memory effect of the type previously discussed.

The above and other objects and features of the invention and the invention itself will be better understood from the following detailed description of embodiments of the invention to be read in conjunction with the accompanying drawings which represent:

FIG. 8 is a two-input circuit which is electrically equivalent to that of FIG. 7 under some operating conditions.

Figure 1:
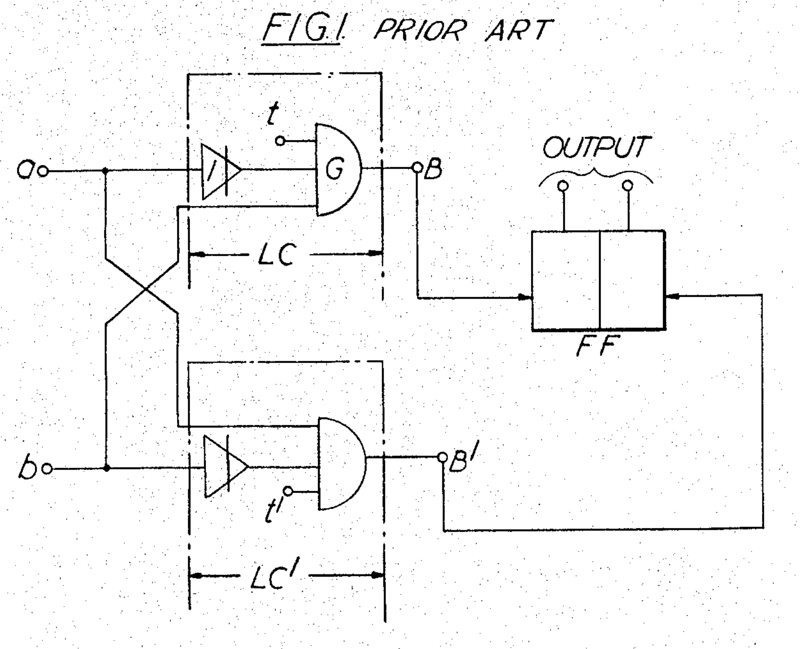
FIG. 1 PRIOR ART
FIG. 1 is a block diagram showing a known logic circuit.

FIG. 1 shows two input terminals *a* and *b* connected to two output terminals B and B'. When an activating signal appears on input terminal *b*, an activating signal also appears at output terminal B, but only if there is no activating signal at input terminal *a*. In like manner, an activating signal appears at output terminal B' in response to an input signal at terminal *a* provided there is no input signal at terminal *b*.

As shown for the transmission from input terminal *b* to output terminal B, the logic function is achieved by a two-input terminal of an AND gate G which is part of the logic circuit LC. The AND gate is fed at one of its inputs by signals appearing on input terminal *b* and at the other of its inputs by signals appearing at the output of an inverter I. The inverter I is, in turn, fed by signals at input terminal *a*.

For synchronous operation, the AND gate G is provided a third input terminal *t* to which a source of clock pulses is connected. These clock pulses will thus be able to reach the output terminal B only when an activating signal is present at input terminal *b* and not present at the input terminal *a*. A logic circuit LC′ (identical to logic circuit LC) interconnects terminals *a* and *b* respectively to B′ in exactly the same way so that a clock pulse at input terminal at *t′* will be able to reach output terminal B′ only in the presence of an activating signal at terminal *a* coinciding with the absence of such a signal at terminal *b*.

With the circuit of FIG. 1, the output terminals B and B′ may be connected to the input terminals of a bistable device or flip-flop FF. Thus, by applying an activating input signal at either input terminal *a* or input terminal *b* (but not simultaneously at both), it will be possible to set the flip-flop FF in either of its two output conditions if it is not already in that condition when the input signal is received. The conditions for setting the flip-flop FF may simultaneously be complemented and interchanged since the coincidence of activating signals at terminals *a* and *b* will remain without effect on the state of the flip-flop.

Alternatively, in another embodiment of the invention, the output terminals B and B′ may be joined as a single output terminal. Here the circuit of FIG. 1 becomes an exclusive-OR circuit.

To provide the logic circuit of FIG. 1 is it necessary to have two AND gates (such as G), two inverters (such as inverter I). Normally, an inverter cannot be made from passive elements; it requires the use of an active element such as a transistor.

Figure 2:
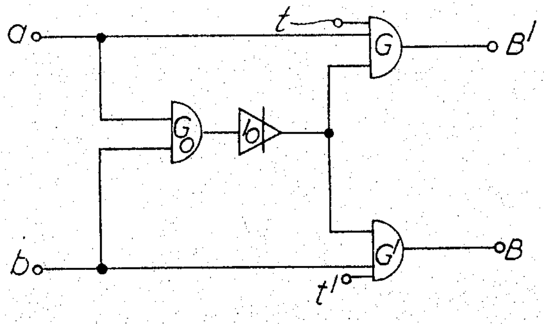
FIG. 2 PRIOR ART
FIG. 2 is a modified version of the circuit of FIG. 1.

FIG. 2 shows an arrangement which is alternative to that of FIG. 1. Here, three AND gates are used to reduce the number of inverters to one, thus saving one active element. In FIG. 2, the gates G and G′ are analogous to those of FIG. 1, but they are each driven at one of their inputs by the output from a single inverter $I_0$. The input terminal for inverter $I_0$ is connected to the output of a third AND gate $G_0$. The two input terminals of gate $G_0$ are connected to the logic input terminals *a* and *b*. While the circuit of FIG. 2 achieves the same logical results as the circuit of FIG. 1, it can no longer be divided into two identical halves and one inverter is still necessary.

Figure 3:
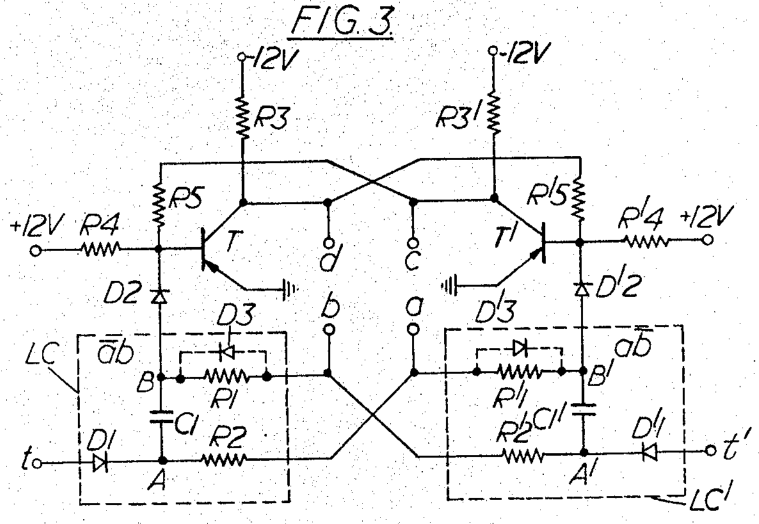
FIG. 3 is a schematic circuit diagram showing an embodiment of the invention as applied to the operation of a two-input bistable circuit.

FIG. 3 shows how the logic circuit LC of FIG. 1 may be made from simple reactance elements by using a capacitor. Here, the input terminal *b* is connected to the output terminal B through resistor $R_1$. The input terminal *a* is connected to a network terminal A through resistor $R_2$. The network terminal A is connected to the output terminal B through capacitor $C_1$ and is also connected to a clock pulse input terminal *t*. The clock pulses are negative voltages applied to back bias a diode $D_1$ poled, as shown. These are the essential elements of the logic circuit LC. Identical functions are provided for the circuit LC′ by the elements having the same reference characters (but with primes) shown on the right-hand side of FIG. 3.

The two output terminals B and B′ are connected to the bases of two PNP transistors T and T′ through individually associated decoupling diodes $D_2$ and $D'_2$ poled (as shown) to apply positive, inhibiting control voltages to the transistor base electrodes. These transistors T, T′ are coupled together to form a conventional bistable flip-flop circuit. Both of the PNP transistors have their emitters directly grounded. Their collectors are individually connected to a (−) 12 volt power supply through load resistors $R_3$ and $R'_3$. Their base electrodes are connected to the junction points of the voltage divider resistors $R_4$, $R_5$ and $R'_4$, $R'_5$, both of the voltage dividers being connected between a (+) 12 volt power supply and the collector of the other PNP transistor. The output terminals of this flip-flop circuit are designated *c* and *d*; they are the collectors of the transistors T′ and T respectively.

An examination of the logic circuit of FIG. 1 will make it clear that a coincidence of activating input signals at terminals *a*, *b* cannot change the state of the flip-flop FF. Accordingly, it is immaterial whether the clock pulses appear simultaneously at the two inputs *t*, *t′*. Thus a signal source of clock pulses may be used to energize these two "*t*" terminals simultaneously, and they can be strapped together.

The flip-flop of FIG. 3 uses active elements which are the transistors T and T′. It may be set into either of its two stable conditions when the D.C. supplies of (+) 12 and (−) 12 volts are first applied to the circuit. However, by delaying the application of one of the (−) 12 volt source to one of the collectors, the flip-flop is initially set to either condition.

To explain the functioning of the input circuits, it will be assumed that transistor T is conducting and the transistor T′ is not conducting. Thus, the flip-flop output terminal *d* is at substantially 0 volts whereas the output terminal *c* is at substantially (−) 12 volts. Under these conditions the base of the output transistor T is also at substantially 0 volts.

Figure 4:
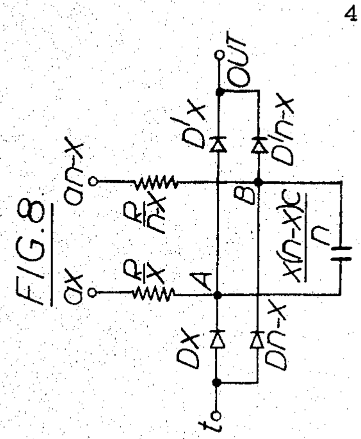
FIG. 4 is a graph of voltage wave forms appearing at various points in the circuit of FIG. 3.
Figure 4:
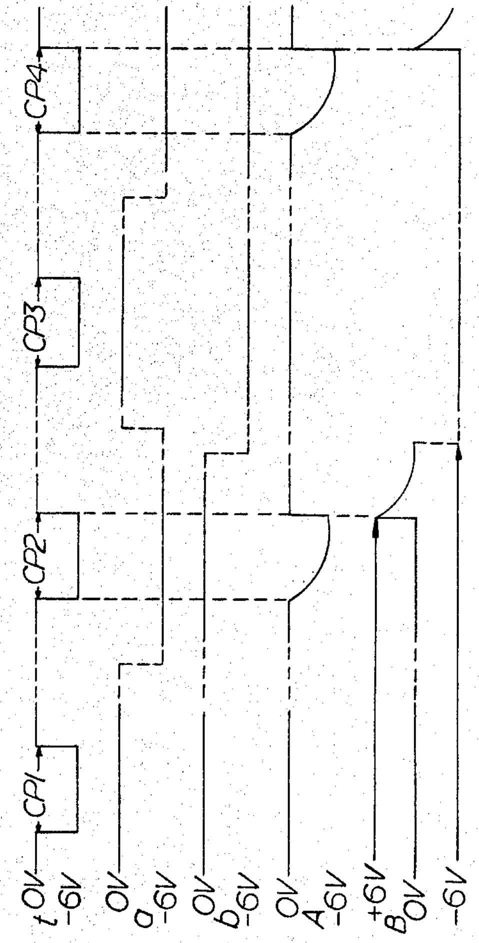

FIG. 4 shows five voltage wave forms which appear at the terminals *t, a, b,* A and B of the circuit of FIG. 3. As shown at the top of FIG. 4, rectangular negative clock pulses are present at terminal *t*. These negative pulses bring the normal 0 volt level at terminal *t* to (−) 6 volts during the pulses. Four such negative clock pulses are shown in FIG. 4 by solid lines separated by dotted lines. These pulses correspond to the four possible states of the two-level input signals which may appear at input terminals *a* and *b*.

The circuit operates this way. When the first negative clock pulse arrives at terminal *t*, both of the input terminals *a* and *b* are at 0 volt; both of the terminals A and B are also at 0 volt, and the capacitor C is discharged. The arrival of the negative clock pulse CP1 at terminal *t* is without effect on the potentials at the terminals A and B, since the diode $D_1$ is blocked by the negative clock.

Assuming that, at a later instant, the potential at input terminal *a* is (−)6 volts and the potential at input terminal *b* is still 0 volt. Before the arrival of the second clock pulse CP2 at terminal *t*, the potential at terminals A and B is 0 volt. Although *a* is now at (−)6 volts, diode $D_1$ conducts, and the 0 volt potential at terminal *t* is present at network terminal A. As soon as clock pulse CP2 appears, the input potential at terminal *t* drops to (−)6 volts, and diode $D_1$ is blocked. Capacitor $C_1$ is charged over a circuit traced from terminal *b* through resistor $R_1$, capacitor $C_1$, and resistor $R_2$. The potential at terminal A goes down exponentially from 0 to (−)6 volts, as shown on curve A of FIG. 4. Having attained that (−)6 volt potential when the positive trailing edge of the negative clock pulse arrived at terminal *t*, the potential at network terminal A suddenly raises to 0 volt. This raise in potential is, in effect, a positive step of 6 volts which is passed by the capacitor $C_1$ to the output terminal B where it appears as a positive (+)6 volt trigger pulse for switching the flip-flop circuit, see curve B of FIG. 4. The positive pulse goes through the conductive diode $D_2$ to reach the base of transistor T. Thus, the PNP transistor T starts the usual cumulative flip-flop action which causes the transistor T to become blocked and the transistor T′ to become conductive. The positive pulse at terminal B decays to 0 volt when the charge on capacitor $C_1$ disappears owing to the current flowing through resistor $R_1$ and diode $D_2$.

Thus, upon the conincidence of the conditions where the terminal *a*=(−)6 volts and the terminal *b*=0 volt, an output trigger pulse is produced by the trailing edge of the clock pulse CP2 at terminal $t$ to trigger the flip-flop into the condition where the transistor T is conductive.

If it is desirable to speed up the arrival of the (—)6 volt potential at terminal A without changing the value of the resistances $R_1$ and $R_2$ and the duration of the negative clock pulses, a diode $D_3$ may be connected across resistor $R_1$. This diode is conductive while terminal A drops to (—)6 volts. The time constant of the exponential charge on capacitor $C_1$ is then decreased to the mathematical value of $C_1R_2$. This diode $D_3$ is blocked during the potential decrease at point B.

During a third phase, shown at CP3 in FIG. 4, the potentials at input terminals $a$ and $b$ are 0 and (—)6 volts respectively; the corresponding potentials at output terminals A and B are 0 and (—)6 volts respectively. Capacitor $C_1$ is correspondingly charged before the arrival of the negative clock pulse at terminal $t$. However, this clock pulse has no effect since, even though diode $D_1$ is blocked, the 0 volt potential is maintained at output terminal A because input terminal $a$ is at that potential.

The fourth and last phase is shown at CP4 in FIG. 4. Both of the input terminals $a$ and $b$ stand at (—)6 volts before the arrival of the negative clock pulse at the terminal $t$. Accordingly, output terminals A and B are at 0 and (—)6 volts respectively, with capacitor $C_1$ being correspondingly charged. Unlike the third phase, however, the 0 volt potential at terminal A is now applied through the conducting diode $D_1$. When the negative clock pulse arrives at terminal $t$, diode $D_1$ becomes blocked, and the charged capacitor C discharges since both of the input terminals $a$ and $b$ are standing at (—)6 volts. The exponentially decreasing current flows through resistors $R_2$ and $R_1$, the latter eventually being decoupled by the conductive diode $D_3$. When the positive going edge of the clock pulse CP4 arrives, the potential at terminal A suddenly jumps to 0 volt. The diode $D_1$ becomes conductive, and this potential jump is forwarded by capacitor $C_1$ to terminal B so that the latter suddenly rises from (—)6 to 0 volt. The potential at terminal B decays exponentially thereafter with a time constant $C_1R_1$ to reach a (—)6 volt potential. But the positive pulse at terminal B reaches only the 0 volt level, and this is insufficient to influence the state of the flip-flop which remains, as assumed, with transistor T conductive.

It is clear from the preceding explanations that a potential of (—)6 volts at input terminal $a$ and of 0 volt at input terminal $b$ will succeed in reversing the flip-flop condition when transistor T is conductive. A reversal of the flip-flop state occurs when transistor T′ is conductive when input terminal $b$ reaches (—)6 volts and input terminal $a$ is a 0 volt since in this case a jump from 0 to (+)6 volts occurs at output terminal B′ and makes diode $D'_3$ conductive. This reverses the flip-flop state by blocking transistor T′ and rendering transistor T conductive.

A more general form of an exclusive-OR gate is a logic circuit with more than two input terminals, each driven by a source of two-level signals and the logic circuit providing an activating output signal which depends on whether all the input signals coincide or not.

Figure 5:
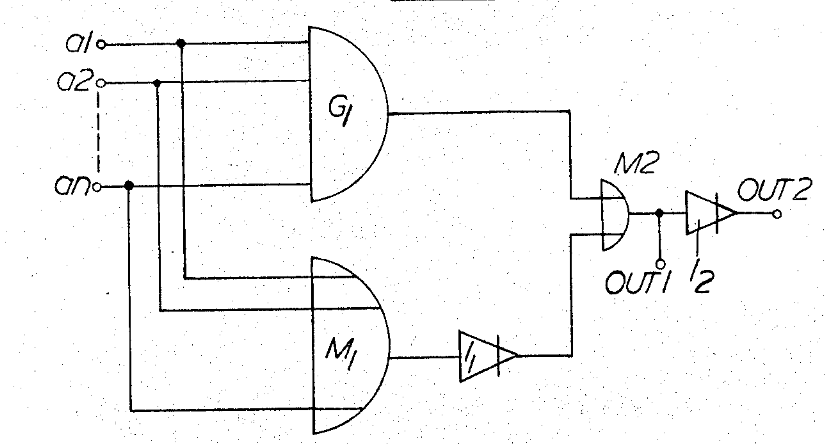
FIG. 5 is a block diagram showing another known logic circuit.

FIG. 5 shows the principle of such a circuit which is seen to include an AND gate $G_1$ with $n$ inputs numbered from $a_1$ to $a_n$ to which the two-level signal sources are connected. These same inputs are also connected to the inputs of an OR gate $M_1$. The output of AND gate $G_1$ and the logical inverse of the output from OR gate $M_1$ (obtained through an inverter $I_1$) are mixed together with the help of a second OR gate $M_2$. The output OUT 1 of the gate $M_2$ thus provides an activating output signal either when all of the inputs $a_1$–$a_n$ are activated or when none of them are so activated. By placing a second inverter $I_2$ at the output of OR gate $M_2$, the output terminal OUT 2 delivers an activating output signal when at least one of the input signals does not coincide with all the others.

Figure 6:
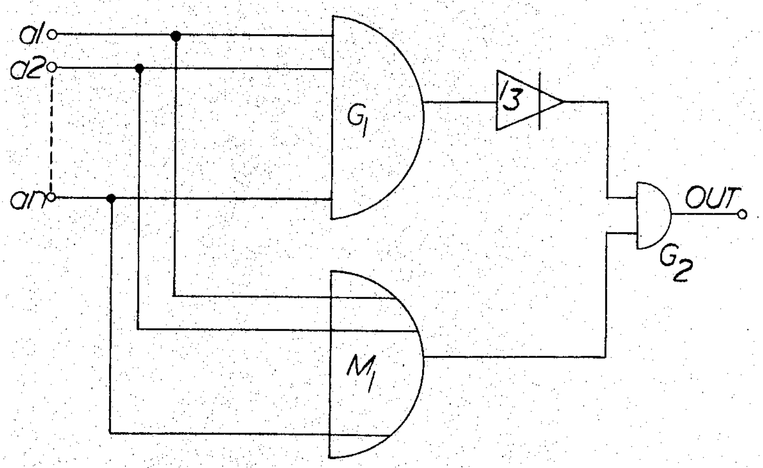
FIG. 6 is a modified version of the circuit of FIG. 5.

FIG. 6 shows an alternative logic circuit analogous to that in FIG. 5. It can also provide an activating output signal whenever all of the input signals do not coincide with one another. In FIG. 6, an inverter $I_3$ is located at the output of the AND gate $G_1$. The output of inverter $I_3$ is mixed together with the output of the OR gate $M_1$ by a final AND gate $G_2$ for delivering an activating output signal at the terminal OUT only upon a lack of coincidence of input signals. While this circuit of FIG. 6 saves an inverter as compared with the circuit of FIG. 5, it requires an additional AND gate. Moreover, with diode gates, an OR gate cannot be followed directly by an AND gate.

Figure 7:
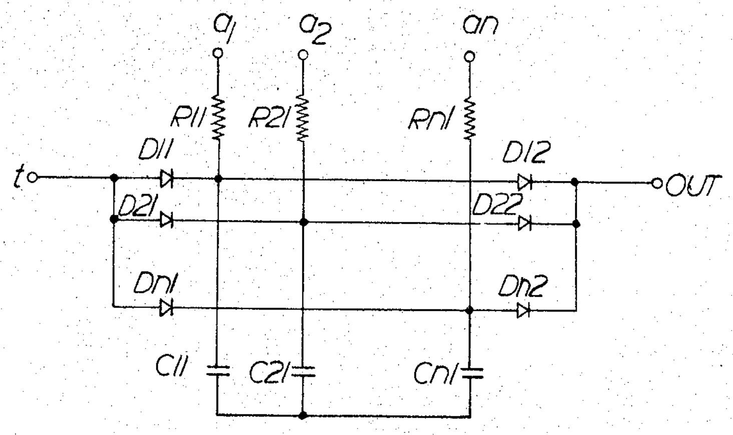
FIG. 7 is a generalized embodiment of the invention which may be described as an n-input anti-coincidence circuit.

FIG. 7 shows a generalized version of the circuit already described with the help of FIGS. 5 and 6. This circuit is particularly useful when the number $n$ of the controlling input signals is not necessarily limited to two. It shows a series of input terminals designated $a_1$, $a_2$, . . . $a_n$ to which the sources of two-level input signals may be connected. These terminals $a_1$–$a_n$ are interconnected in a star network, each by means of a plurality of resistances, each being connected in series with a capacitor—such as resistor $R_{11}$ and capacitor $C_{11}$ which are a series circuit connected to terminal $a_1$. The capacitor plates which are on the side away from their respective individual resistances are all connected together. An input terminal $t$, to which negative clock pulses of the type shown in FIG. 4 may be applied, is shown as connected to the $n$ number of junction points between each resistance such as $R_{11}$ and its associated capacitor such as $C_{11}$. These connections are made by means of an individual diode $D_{11}$ poled as shown. The $n$ number of junction points are, in turn, all connected to a single output terminal OUT through the individual decoupling diodes such as $D_{12}$ poled as shown.

While FIG. 7 shows a particular case in which there is but a single source of clock pulses $t$ to produce the output signals, this is not essential. Depending upon the logic requirements and the manner in which the circuit of FIG. 7 should operate, clock pulses may be applied to more than one input terminal. Thus, the clock pulse input terminals need not necessarily be coupled to all of the $n$ number of junction points but may be coupled to various combinations thereof. Likewise, this is also true for the single output terminal shown since there may be a plurality of output terminals. These output terminals need not necessarily be connected to all the $n$ number of junction points between the resistances and their associated capacitors. This should be already clear from the circuit of FIG. 3. For each of the two LC circuits there shown, each with two signal input terminals $a$ and $b$, the clock pulses are applied at terminal $t$ and directed toward a junction point A or A′ between a resistor and capacitor. The output signals are derived solely from the other junction point B or B′. There is, of course, only a single capacitor when $n$=2 due to the combination of the two series condensers, $C_{11}$ and $C_{21}$, FIG. 7. Any suitable network of capacitors may be used to connect one end of each resistance of FIG. 7 to a corresponding end of all other resistances. However, the star network of $n$ condensers will generally be the simplest if the number $n$ exceeds 3.

The operation of the circuit of FIG. 7 may be deduced from the explanations previously given in relation to FIGS. 3 and 4, but first an equivalent circuit should be derived to facilitate an understanding of the circuit.

FIG. 8 shows a circuit which is electrically equivalent to that of FIG. 7. It is readily obtained by considering that in FIG. 7 any number "$x$" of the input terminals $a_{1/n}$ are at one of the two possible input potentials. The remaining number of terminals "$n$—$x$" are at the other input potential value. In such a case, circuit symmetry produces the electrically equivalent circuit of FIG. 8 by paralleling all of the input sources that are then producing the same potential.

The corresponding junction points between a resistance and its associated capacitor may also be interconnected.

Thus, in FIG. 8, terminal $a_x$ symbolizes the "$x$" number of input terminals at a first potential, and terminal $a_{n-x}$ symbolizes the remaining input terminals. Terminal $a_x$ is connected through a resistance $R/x$ in series with a capacitor $$\frac{x(n-x)C}{n}$$

and terminal $a_{n-x}$ is connected through a resistance $R/n-x$ to the same capacitors. The letter R indicates the common value of all the capacitors $R_{11/n1}$ and the letter C indicates the common value of all the capacitors $C_{11/n1}$ of FIG. 7. The two junction points A and B connect to the single equivalent capacitor and the two equivalent resistances are connected to the input and output terminals through the equivalent diodes $D_x$, $D_{n-x}$ and $D'_x$, $D'_{n-x}$ respectively.

Considering the potentials at terminals $a_x$ and $a_{n-x}$, it is clear that if they are both at the same level of 0 volts or at the same level of (—)6 volts, there is no potential difference across the equivalent capacitor. Accordingly, the positive trailing edge of a negative clock pulse appearing at terminal $t$ returns the potential level at terminal $t$ from (—)6 to 0 volts and does not produce a pulse at the output terminals. Instead, the output terminal remains at 0 volts if the load (not shown) is biased to that potential. However, if terminals $a_x$ and $a_{n-x}$ are at different potential levels, a positive trigger pulse moving from 0 to (+)6 volts will be produced at the output terminal when the positive trailing edge of the clock pulse appears.

Suppose that terminal $a_x$ is at 0 volts and terminal $a_{n-x}$ is at (—)6 volt. As long as terminal $t$ is at 0 volts, diode $D_{n-x}$ conducts and both point A and B are at 0 volts. But when a negative clock pulse arrives at point $t$, diode $D_{n-x}$ becomes back-biased. The equivalent capacitor is exponentially charged until the potentials at points A and B reach the 0 volt and (—)6 volt levels respectively. At the end of the clock pulse when the potential at terminal $t$ suddenly returning from (—)6 volts to 0 volts, diode $D_{n-x}$ becomes conductive. The potential at point B jumps to 0 volts, and a resultant positive voltage kick passes through the equivalent capacitor and appears at point A in the form of a positive output trigger pulse having an initial amplitude of (+)6 volts and which passes to the output terminal OUT via diode $D'_x$. Due to the symmetry of the circuit, the results will be similar if the potential conditions are reversed and (—)6 volts appear at input terminal $a_x$ and 0 volts appear at terminal $a_{n-x}$.

In this circuit the time constant of the exponential charge of the equivalent capacitor is equal to CR. Thus, it is independent of both the number "$x$" of input terminals which are at a same potential and the remaining ones at the other potential. In the circuit of FIG. 7, the resistances may be decoupled by suitably poled diodes similar to the diode $D_3$ in FIG. 3. However, if "$r$" is used to indicate the resistance of a conductive diode, the time constant now becomes dependent on "$x$" since the constant becomes equal to $$C\left(r+\frac{x}{n}(R-r)\right)$$

or $$C\left(R+\frac{x}{n}(r-R)\right) \text{ with a maximum value of } \frac{(n-1)R+r}{n}$$

When there are merely two inputs, however, the time constant will be the same for the two possible conditions producing a positive output pulse.

Thus it is clear from FIG. 8, that particularly simple logic circuits have been provided for detecting an anti-coincidence of input signals. In doing so, transistorized circuits are avoided. Also, a capacitor may replace one of the diodes shown in FIG. 7 to cause a sharp output trigger pulse corresponding to the trailing edge of the input clock pulse. Moreover, the circuit is insensitive to changes occurring in the levels of the input signals at the time of the clock pulses, i.e. such changes cannot affect the output pulse.

The equivalent circuit of FIG. 8 is a particularly simple two-input, one-output logic circuit identified as an exclusive-OR gate. Among other things, such an exclusive-OR gate may perform as a half-subtracter since it will produce at its output OUT the binary difference between the two binary input signals. Assuming that the minuend is applied at terminal $a_x$ and the subtrahend at terminal $a_{n-x}$ with the 0 volt and (—)6 volt levels corresponding to digits 1 and 0 respectively, the output borrow signal will be readily available at point B.

The circuit of FIG. 8 also corresponds to a two-input clock controlled circuit which may be used with two separate outputs by breaking the connection between the cathodes of the diodes $D'_x$ and $D'_{n-x}$. In this case, the circuit of FIG. 8 may be used in place of that shown at the input of the flip-flop of FIG. 3. In other words, in FIG. 3 the circuit may be simplified by strapping A' to B on the one hand and A to B' on the other with a result that two resistors and one capacitor can be spared.

In principle, the clock pulses could also be applied to the junction point between the capacitors so that in the two-input circuit two capacitors would be retained but only one diode would be necessary to connect the clock pulses to the junction point of the capacitors. But the amplitudes of the output trigger pulses would be halved.

It is clear from what precedes that the invention may be applied in many different circumstances, and that many variations of the circuits illustrated are possible, including those obtained by well known principles of equivalence such as polarity reversals and the duality principle.

While the principles of the invention have been described above in connection with specific apparatus, it is to be clearly understood that this description is made only by way of example and not as a limitation on the scope of the invention.

I claim:

1. An anti-coincidence logic circuit comprising two or more inputs, means including a plurality of branches with each of said branches having a resistive impedance coupled between a corresponding one of the inputs and an associated one of a plurality of points, means comprising a network of reactive impedances for coupling said points together, thereby joining said branches to one another, at least one source of clock pulses coupled to the reactive network through at least one diode, and logic means for controlling the storage or discharge of energy in the reactive impedance to which said clock pulses are applied, said logic means operating responsive to one potential level of said clock pulse for enabling energy to be stored in the reactive impedances to which said clock pulses are applied when there is an anti-coincidence in the potential levels of signals applied to said inputs, said energy being stored in said reactive impedances at a predetermined level as a result of energy dissipated in at least one of said resistive impedances, and said logic means operating responsive to another potential level of said clock pulses for delivering distinguishable output signals from said reactive impedances.

2. The anti-coincidence logic circuit as claimed in claim 1, wherein said resistive impedances are interconnected at their ends away from said inputs by said reactive impedance including at least one capacitor, and at least one source of said clock pulses is connected to at least one of said capacitors through at least one diode.

3. The anti-coincidence logic circuit as claimed in claim 1 and wherein said reactive impedance includes at least a capacitor, whereby two of said inputs are interconnected by two of said impedances separated by said capacitor, a plurality of diodes and means for applying the output of said source of clock pulses through respective ones of said diodes to both sides of said capacitor, and means for delivering separate output signals from either side of said capacitor.

References Cited by the Examiner

UNITED STATES PATENTS

| | | | |
|---|---|---|---|
| 2,781,447 | 2/1957 | Lester | 328—195 X |
| 2,802,940 | 8/1957 | Burton | 328—196 |
| 3,013,163 | 12/1961 | Richards | 307—88.5 |
| 3,059,127 | 10/1962 | Snijders | 307—88.5 |
| 3,091,737 | 5/1963 | Tellerman et al. | 307—88.5 X |

ARTHUR GAUSS, *Primary Examiner.*

I. C. EDELL, *Assistant Examiner.*